United States Patent
Konaka et al.

(10) Patent No.: US 10,005,419 B2
(45) Date of Patent: Jun. 26, 2018

(54) HEAD-PROTECTING AIRBAG DEVICE

(71) Applicant: TOYODA GOSEI CO., LTD., Kiyosu-shi, Aichi-ken (JP)

(72) Inventors: Hirotake Konaka, Inazawa (JP); Yoshitomo Kato, Kiyosu (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 42 days.

(21) Appl. No.: 15/381,561

(22) Filed: Dec. 16, 2016

(65) Prior Publication Data
US 2017/0182964 A1 Jun. 29, 2017

(30) Foreign Application Priority Data

Dec. 28, 2015 (JP) ................................. 2015-257161

(51) Int. Cl.
*B60R 21/213* (2011.01)
*B60R 21/237* (2006.01)

(52) U.S. Cl.
CPC .......... *B60R 21/213* (2013.01); *B60R 21/237* (2013.01)

(58) Field of Classification Search
CPC ........................... B60R 21/213; B60R 21/237
See application file for complete search history.

(56) References Cited

U.S. PATENT DOCUMENTS

| | | | | |
|---|---|---|---|---|
| 2007/0024031 A1* | 2/2007 | Coleman | ............... | B60R 21/213 280/728.2 |
| 2008/0284142 A1* | 11/2008 | Cheal | .................... | B60R 21/201 280/730.2 |
| 2009/0302581 A1 | 12/2009 | Yokota et al. | | |
| 2011/0042923 A1* | 2/2011 | Hatfield | ................. | B60R 21/201 280/730.2 |
| 2011/0175333 A1* | 7/2011 | Mitchell | ............... | B60R 21/201 280/728.2 |
| 2015/0291119 A1* | 10/2015 | Noma | ................... | B60R 21/201 280/728.2 |
| 2016/0159308 A1* | 6/2016 | Choi | ..................... | B60R 21/213 280/728.2 |
| 2017/0247008 A1* | 8/2017 | Witt, Jr. | ................. | B60R 21/213 |
| 2018/0015901 A1* | 1/2018 | Konaka | ................. | B60R 21/213 |

FOREIGN PATENT DOCUMENTS

| | | | | |
|---|---|---|---|---|
| JP | 2009-292441 A | | 12/2009 | |
| JP | 2012101595 A | * | 5/2012 | ........... B60R 21/213 |
| WO | WO2012063702 A1 | * | 5/2012 | ........... B60R 21/213 |

* cited by examiner

Primary Examiner — Drew J Brown
(74) Attorney, Agent, or Firm — Posz Law Group, PLC

(57) ABSTRACT

A head-protecting airbag device includes: an airbag including: an airbag body; and a connecting tab connected with a mounting bracket, wherein the mounting bracket includes: a mounting piece mounted on the body with a fixing means; and a connecting piece formed to project to both sides from a lower end of the mounting piece, and connected with the airbag; in the connecting tab, an insertion hole, into which the mounting piece is inserted, is disposed in a folded portion; the connecting tab includes a front side portion and a back side portion which extend from the folded portion to the airbag body and cover a font side and a back side of the connecting piece; and a loop coupling portion is disposed in a position where the mounting piece having the connecting piece stored in the connecting tab is prevented from coming off the insertion hole.

7 Claims, 15 Drawing Sheets

SECTIONAL VIEW OF PORTION TAKEN ALONG LINE A-A

FRONT AND REAR DIRECTION

INDOOR AND OUTDOOR DIRECTION

HEAD-PROTECTING AIRBAG DEVICE

CROSS-REFERENCE TO RELATED APPLICATION(S)

This application is based upon and claims the benefit of priority from Japanese Patent Application No. 2015-257161, filed on Dec. 28, 2015, the entire contents of which are incorporated herein by reference.

BACKGROUND

1. Field of the Invention

The present invention relates to a head-protecting airbag device which includes an airbag which is stored in an upper edge on an indoor side of a vehicle and is inflated to cover an indoor side of a window when inflation gas is allowed to flow inside, and a mounting bracket which mounts an upper edge of the airbag on a body on an upper edge side of the window.

2. Description of the Related Art

In the related art, a head-protecting airbag device is configured such that a loop-shaped connecting tab, which protrudes upwards from an upper edge of an airbag body of an airbag and has flexibility, is connected to a mounting bracket, and the mounting bracket is mounted to a body, so that the airbag is mounted on a body on an upper edge side of a window. Specifically, in the conventional head-protecting airbag device, the mounting bracket includes a mounting piece mounted on the body, and an insertion hole formed to be open such that the connecting tab can be inserted in the lower area of the mounting piece. The connecting tab is inserted into the insertion hole to connect the mounting bracket and the airbag (for example, see JP-A-2009-292441). In the head-protecting airbag device disclosed in JP-A-2009-292441, when the airbag body is inflated, the connecting tab is locked in the circumferential edge of the insertion hole in the mounting bracket.

However, in the head-protecting airbag device according to the related art, the connecting tab is mounted by being inserted into the insertion hole disposed in the lower portion of the mounting piece. Thus, when the airbag body is deployed and inflated to project downward by allowing the inflation gas to flow thereinto, the connecting tab is strongly pulled downward. Large tensile force acts downward on the vicinity of the center in the circumferential edge of the insertion hole, so that the mounting bracket may largely be deformed to open the insertion hole. In a case where the mounting bracket is largely deformed as above, a position deviation occurs also in the airbag body connected with the mounting bracket through the connecting tab. Therefore, there is a risk that the inflated airbag body cannot smoothly cover the indoor side of the window.

SUMMARY

The present invention is made to solve the above-described problem, and an object thereof is to provide a head-protecting airbag device in which a connecting tab can be tightly connected to a mounting bracket with a simple configuration.

According to an aspect of the invention, there is provided a head-protecting airbag device including: an airbag which is stored in an upper edge on an indoor side of a vehicle and is inflated to cover an indoor side of a window when inflation gas is allowed to flow inside; and a mounting bracket which mounts an upper edge of the airbag on a body on an upper edge side of the window, wherein: the airbag includes: an airbag body; and a connecting tab having a loop-shape, protruding upward from an upper edge of the airbag body, being connected with the mounting bracket and having flexibility; the mounting bracket includes: a mounting piece being mounted on the body with a fixing means; and a connecting piece being formed to be wider than the mounting piece to project to both sides from a lower end of the mounting piece, and being connected with the airbag; in the connecting tab, an insertion hole, into which the mounting piece of the mounting bracket is inserted, is disposed in a folded portion of a tip separated from the airbag body; the connecting tab includes a front side portion and a back side portion which extend from the folded portion to the airbag body and cover a font side and a back side of the connecting piece; and a loop coupling portion of the front side portion and the back side portion which form the connecting tab in a loop shape is disposed in a position where the mounting piece of the mounting bracket having the connecting piece stored in the connecting tab is prevented from coming off the insertion hole.

In the head-protecting airbag device of the present invention, when the airbag body is deployed, the connecting tab is supported by the connecting piece, which projects from the lower end of the mounting piece to the both sides, in the circumferential edge of the insertion hole into which the mounting piece is inserted. Thus, although the connecting tab is pulled downward strongly when the airbag body is deployed, through the mounting piece interposed between the both sides, a tensile force is dispersedly received by the connecting piece projecting from the mounting piece to the both sides. Therefore, the tensile force is hard to focus on one point, whereby it can be suppressed the tensile force is received to deform the mounting bracket. The connecting tab is configured such that the loop coupling portion of the front side portion and the back side portion which are formed in a loop shape is disposed in such a position that can prevent the mounting piece from coming off the insertion hole. Thus, it is possible that the mounting bracket assembled with the connecting tab does not come off the connecting tab, and the mounting bracket is smoothly fixed to the body or is assembled to a predetermined case. Although the connecting tab is floated up by reaction generated after the connecting tab is strongly pulled downward at the time of inflating the airbag body, it can be accurately prevented that the connecting tab comes off the mounting bracket so that the connected state is released. For this reason, in the head-protecting airbag device of the present invention, the deformation of the mounting bracket and the breakage of the connecting tab can be suppressed, and thus the airbag body can be inflated to smoothly cover the indoor side of the window.

Therefore, in the head-protecting airbag device of the present invention, with a simple configuration, the connecting tab can be tightly connected to the mounting bracket.

In the head-protecting airbag device of the present invention, when the loop coupling portion of the connecting tab is disposed in a position, which is separated from the upper edge of the airbag body, of the front side portion and the back side portion, it is easy to set the length dimension of a loop-shaped area of the connecting tab from the loop coupling portion to the tip, and it can be reliably prevented that the mounting bracket comes off the connecting tab. By forming the loop coupling portion, the mounting bracket can be connected to the connecting tab in advance, and by using the connecting tab, handling operability when the mounting bracket is connected to the airbag body is excellent, which is preferable. In a case where the projecting amount of the connecting tab itself from the airbag body is small, the loop coupling portion may be configured to be disposed in a position, which is in the airbag body, of the front side portion and the back side portion.

In the head-protecting airbag device having the above-described configuration, the loop coupling portion may be formed of a linear sewing portion along the projecting direction of the connecting piece from the mounting piece of the mounting bracket. The linear sewing portions may be provided in parallel to each other to be orthogonal to the projecting direction of the connecting piece.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, one embodiment of the present invention will be described with reference to the drawings. In the description of the embodiment, unless otherwise noted, a vertical direction and a front and rear direction match with a vertical direction and a front and rear direction of a vehicle V when a head-protecting airbag device is mounted on the vehicle.

Figure 1:
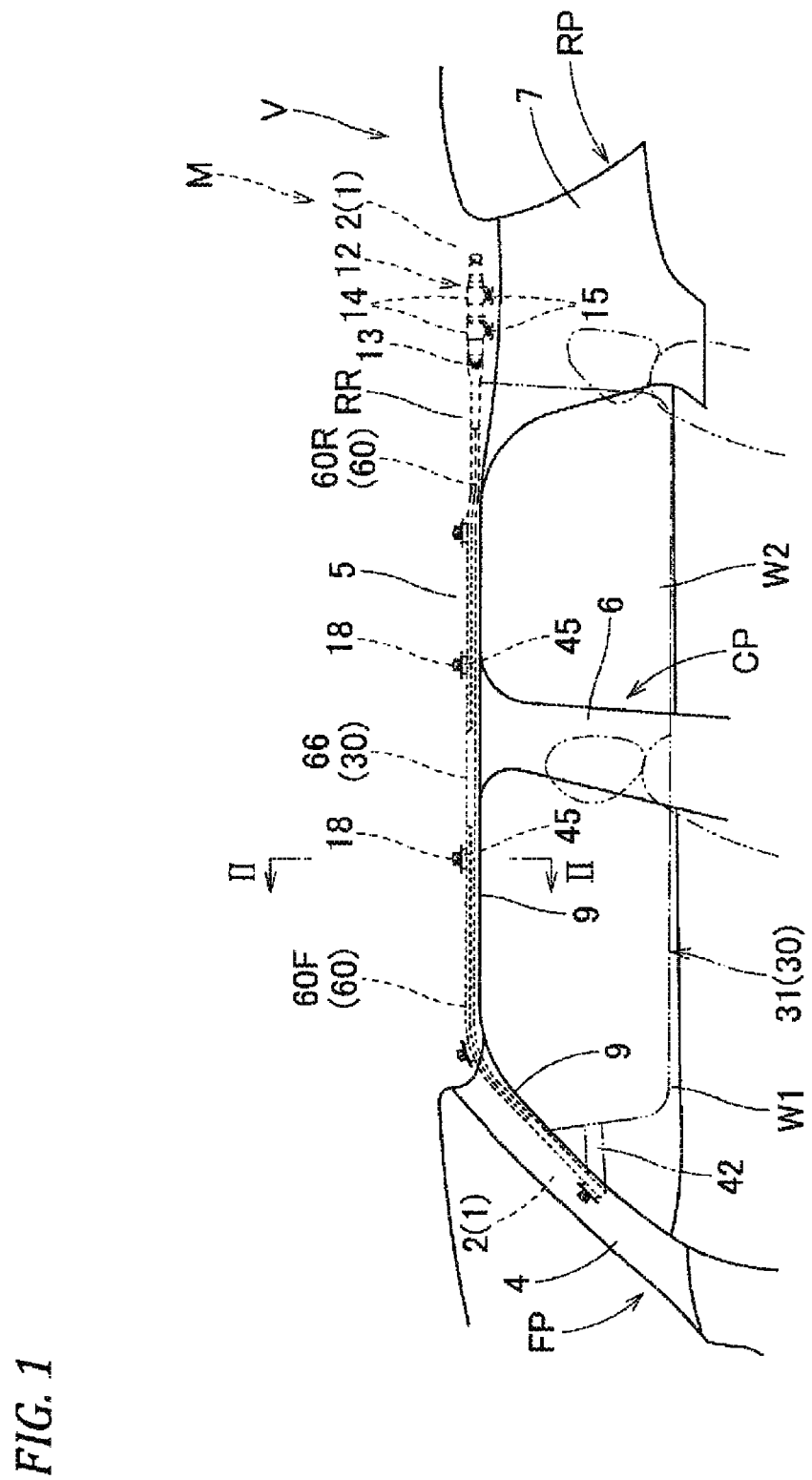
FIG. 1 is a schematic front view of a head-protecting airbag device of one embodiment of the present invention when viewed from an indoor side.

As illustrated in FIG. 1, a head-protecting airbag device M of the embodiment is mounted on the two-row seat type vehicle V having two windows (side windows) W1 and W2. As illustrated in FIG. 1, the head-protecting airbag device M of the embodiment includes an airbag 30, an inflator 12 which supplies inflation gas to the airbag 30, a mounting bracket 14 which mounts the inflator 12 on a body 1, a mounting bracket 18 which mounts the airbag 30 on the body 1, and a case 60 in which the folded airbag 30 is stored. As illustrated in FIG. 1, the airbag 30 is stored in a folded state in an area ranging from the lower edge of a front pillar FP through the lower edge of a roof side rail RR to the upper portion of a rear pillar RP on the upper edge side of the windows W1 and W2 on the indoor side of the vehicle V. When mounted on the vehicle V, the folded airbag 30, the inflator 12, and the case 60 are stored such that the indoor side I thereof is covered with an airbag cover 9 (see FIGS. 1 and 2). In the case of the embodiment, the airbag cover 9 includes the lower edge of a front pillar garnish 4 which covers the indoor side of the front pillar FP, and the lower edge of a roof head lining 5 which covers the indoor side of the roof side rail RR. The front pillar garnish 4 and the roof head lining 5 are made of synthetic resin, and are fixedly mounted on the indoor side I of an inner panel 2 of the body (vehicle body) 1 in the front pillar FP and the roof side rail RR, respectively. The airbag cover 9 is configured to cover the indoor side I of the airbag 30 stored in the folded state, and to be openable to the indoor side I by being pressed by the airbag 30 so that the airbag 30 can project downward on the indoor side when deployed.

The inflator 12 supplies the inflation gas to the airbag 30. As illustrated in FIG. 1, the inflator is a substantially cylindrical type, and a gas discharge port (not illustrated) which can discharge the inflation gas is disposed in the tip thereof. The tip of the inflator 12 including the vicinity of the gas discharge port is inserted to a connection port 35 (to be described later) of the airbag 30, and thus the inflator 12 is coupled with the airbag 30 by using a clamp 13 disposed in the outer periphery of the connection port 35. The inflator 12 is mounted in the position, which is above the rear pillar RP, of the inner panel 2 by using the mounting bracket 14 holding the inflator 12 and a bolt 15 fixing the mounting bracket 14 to the inner panel 2 of the body 1 (see FIG. 1).

Figure 2:
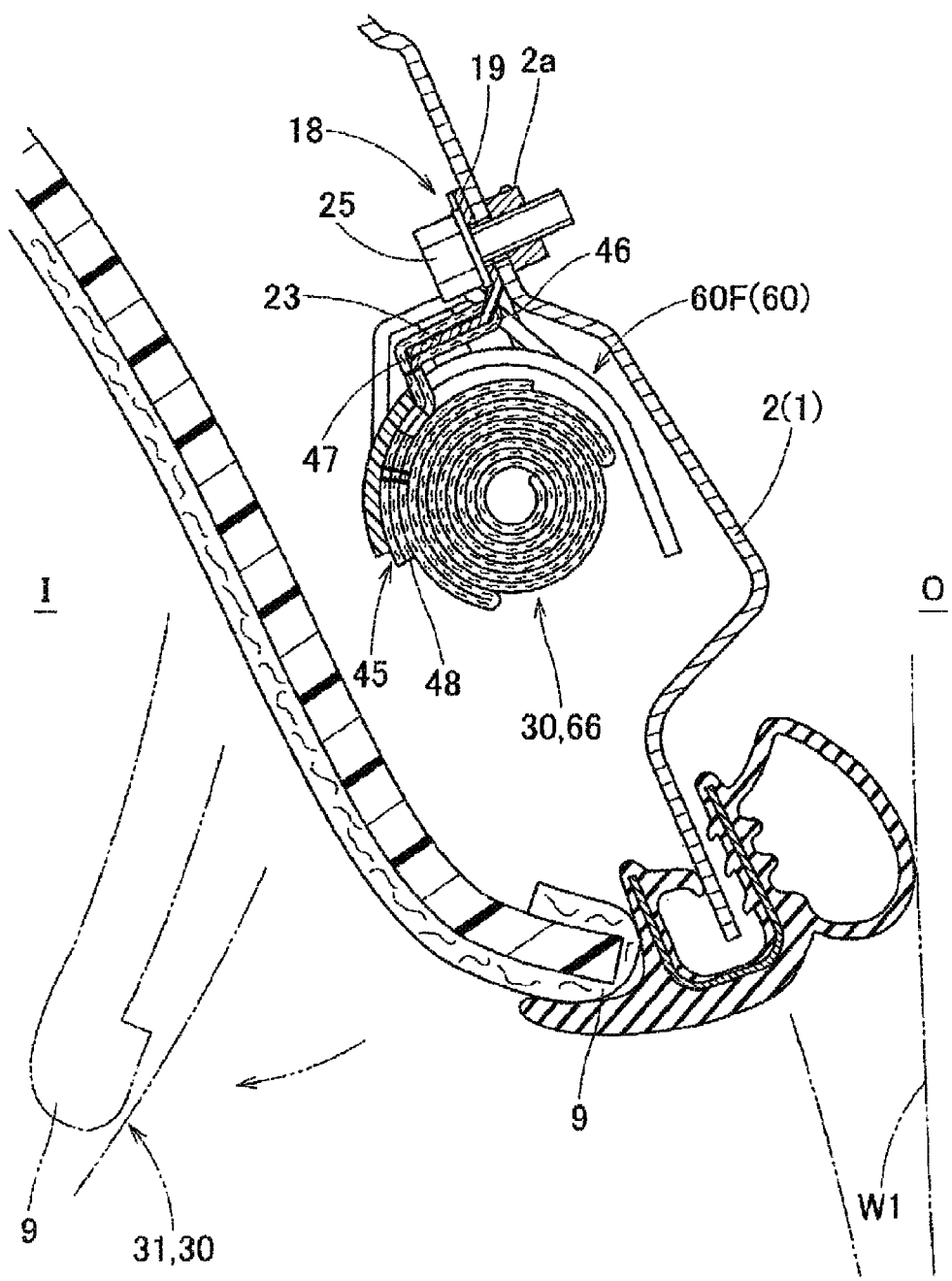
FIG. 2 is a sectional view of a portion taken along line II-II of FIG. 1.
Figure 3:
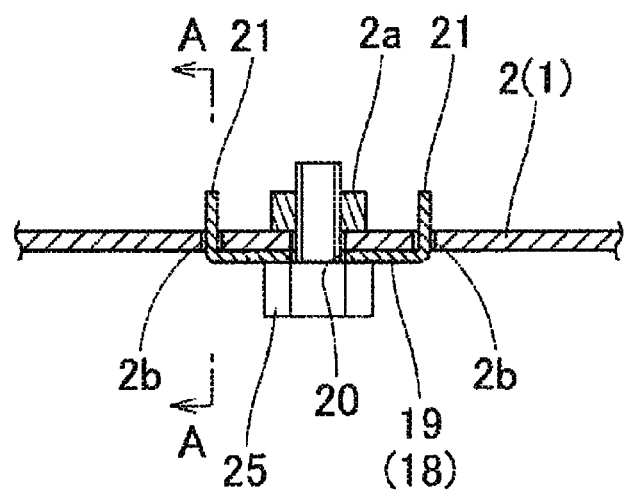
FIG. 3 is a partially enlarged lateral sectional view in a font and rear direction illustrating the state of mounting a mounting piece to an inner panel, and a partially enlarged vertical sectional view illustrating a locking claw of the mounting piece in the head-protecting airbag device of the embodiment.
Figure 3:
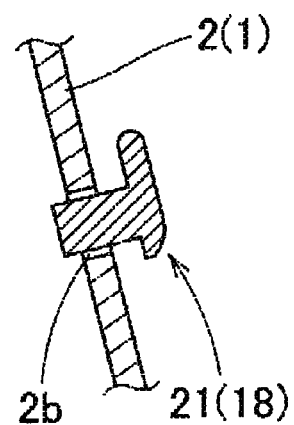
Figure 7:
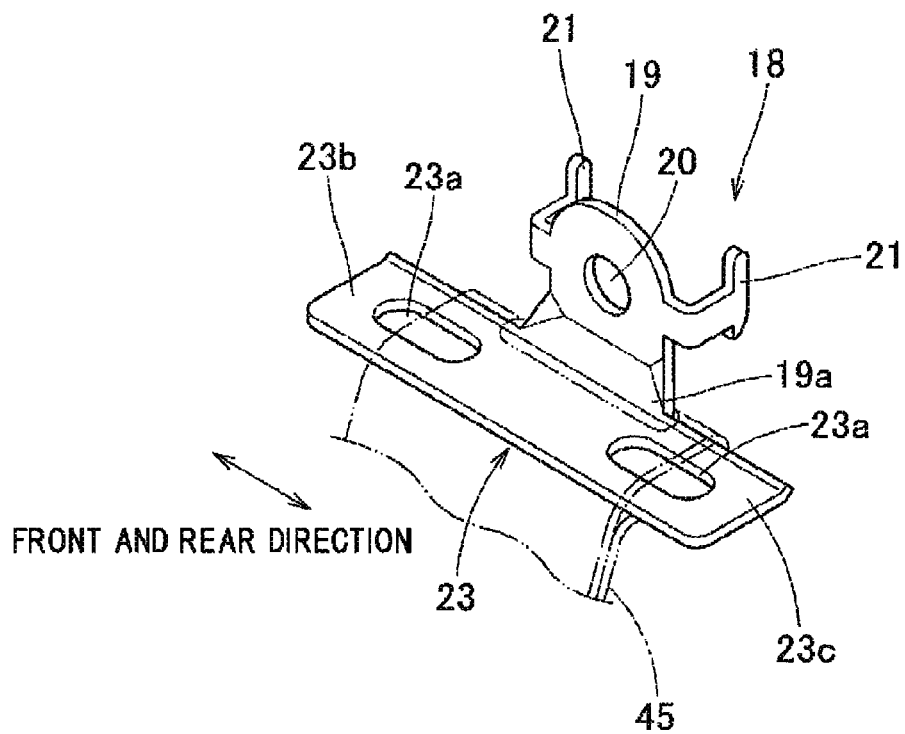
FIG. 7 is a perspective view of the mounting bracket used in the head-protecting airbag device of the embodiment.
Figure 8:
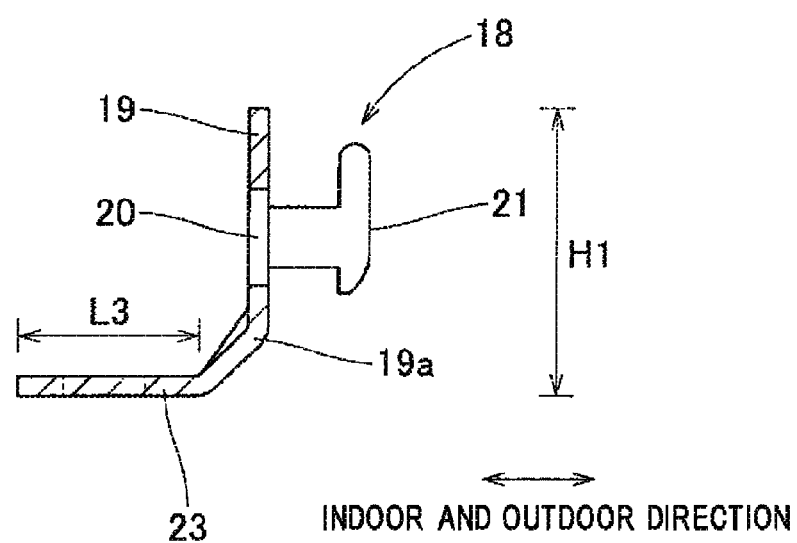
FIG. 8 is a vertical sectional view of the mounting bracket of FIG. 7.

As illustrated in FIGS. 1 to 3, the mounting bracket 18 is a member for mounting the upper edge 31a of the airbag 30 (airbag body 31) on the body 1 on the upper edge side of the windows W1 and W2. As illustrated in FIGS. 7 and 8, the mounting bracket 18 is formed by bending one sheet of metal plate, and includes a mounting piece 19 mounted on the body 1, and a connecting piece 23 disposed in a lower end 19a of the mounting piece 19.

The mounting piece 19 is mounted in the inner panel 2 of the body 1. As illustrated in FIGS. 2 and 3, the mounting piece 19 is formed along the inner panel 2, and has an insertion hole 20 into which a bolt 25 as a fixing means can be inserted. As illustrated in FIG. 3, in both front and rear edges of the mounting piece 19, locking claws 21, which can be temporarily locked in the circumferential edges of locking holes 2b formed in the inner panel 2 at the time of mounting the mounting piece 19 on the inner panel 2, are formed to project upward while projecting to an outdoor side O as the inner panel 2 side (see FIGS. 7 and 8).

Figure 5:
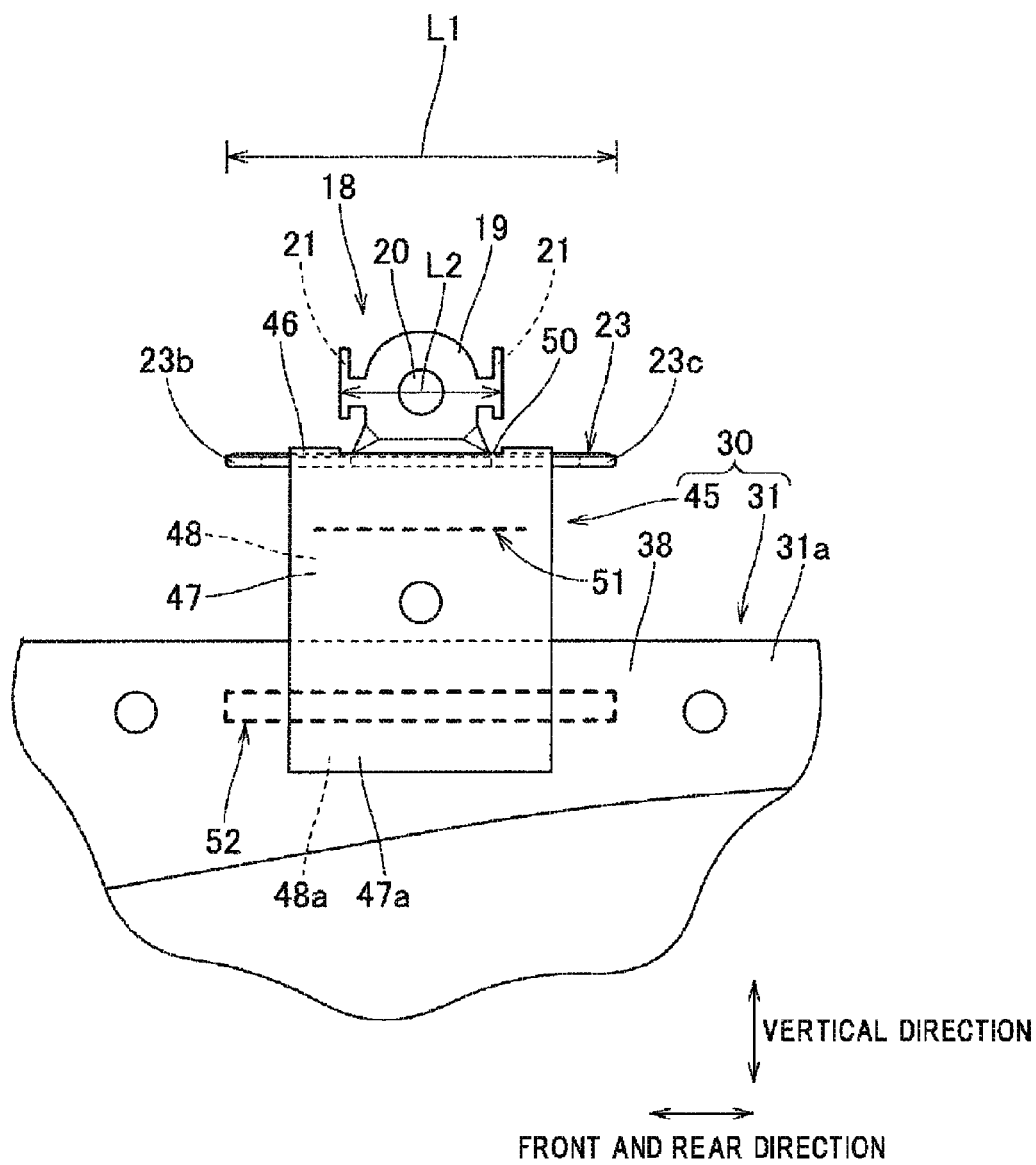
FIG. 5 is a partially enlarged front view illustrating a connecting tab connected with a mounting bracket in the airbag of FIG. 4.
Figure 12A:
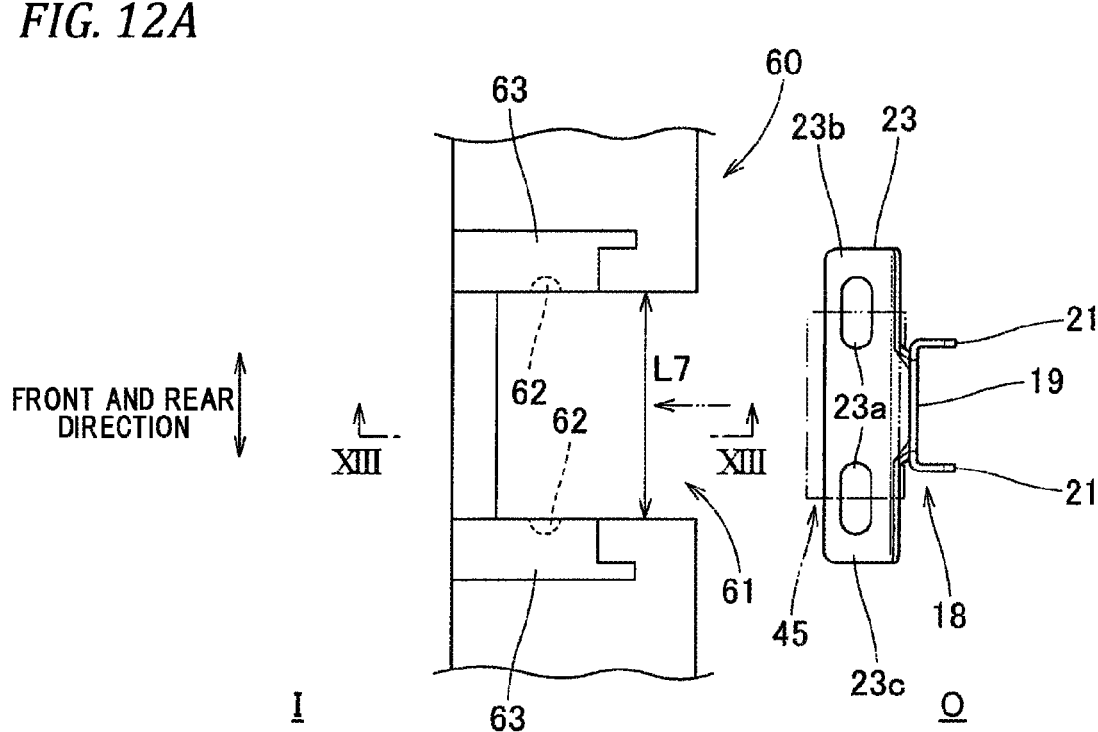
FIGS. 12A and 12B are a plan view of the case illustrated in FIG. 11, and a view illustrating a state where the mounting bracket is mounted in the case.
Figure 12B:
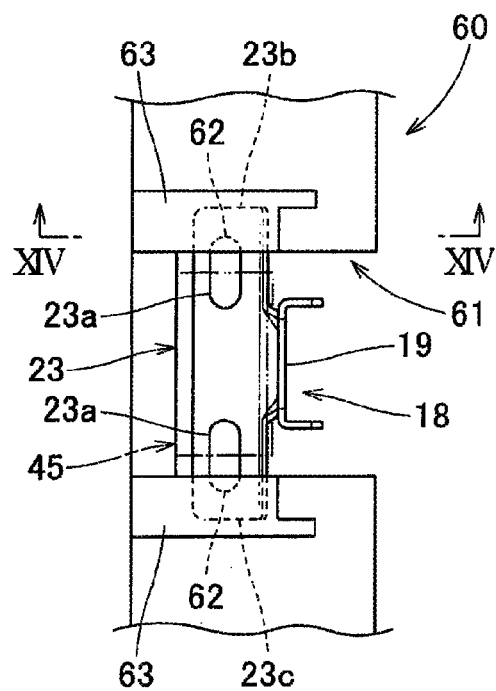
Figure 14:
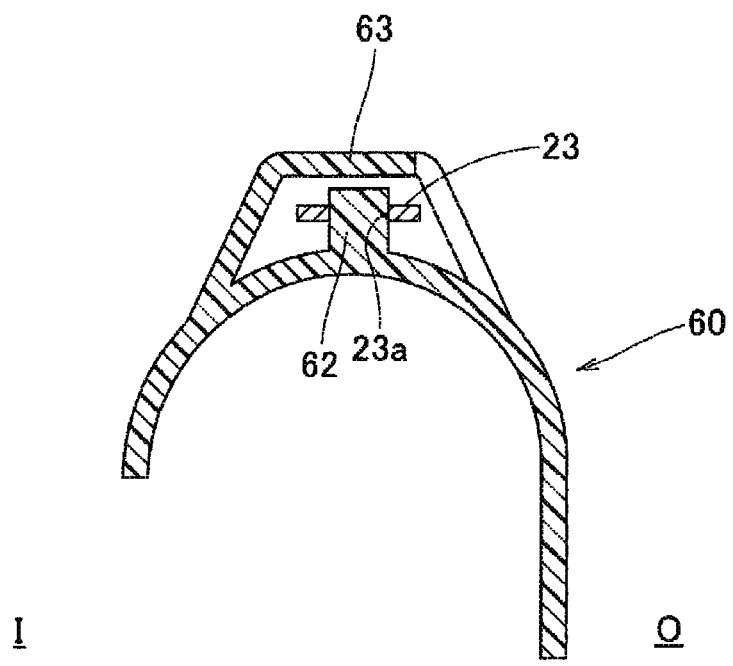
FIG. 14 is a sectional view of a portion taken along line XIV-XIV of FIGS. 12A and 12B.

The connecting piece 23 is formed wider than the mounting piece 19 so as to project from the lower end 19a of the mounting piece 19 to both front and rear sides. Therefore, in the case of the embodiment, as illustrated in FIGS. 7 and 8, the connecting piece 23 is formed to be almost orthogonal to the mounting piece 19 so as to project to the indoor side I while projecting from the lower end of the mounting piece 19 to the both front and rear sides. The connecting piece 23 intends to connect a connecting tab (to be described later) of the airbag 30. As illustrated in FIG. 5, a width dimension L1 in the front and rear direction is set to about five-seconds of a width dimension L2 of the mounting piece 19 in the front and rear direction. As illustrated in FIG. 8, in the connecting piece 23, a width dimension L3 in an indoor and outdoor direction is set to about three-fifths of a height dimension H1 in a vertical direction of the mounting piece 19. In the embodiment, in the connecting piece 23, two openings 23a and 23a which are open in substantially oval shape are formed in both front and rear end positions which are separated in the front and rear from the center in the front and rear direction (see FIG. 7). As illustrated in FIGS. 12B and 14, these openings 23a and 23a intend to insert a protrusion 62 formed in the case 60 in which the folded airbag 30 (completely folded body 66) is stored.

The mounting bracket 18 is connected with the connecting tab 45 in such a manner that the mounting piece 19 is set to project from an insertion hole 50 formed in a folded portion 46 of a loop-shaped connecting tab 45 formed to project from the upper edge 31a of the airbag body 31 of the airbag 30, and a front end portion 23b and a rear end portion 23c of the connecting piece 23 are set to project from the connecting tab 45. At that state, the mounting piece 19 is temporarily fixed to a predetermined position of the inner panel 2 by locking the locking claw 21 to the circumferential edge of the locking hole 2b formed in the inner panel 2. The mounting piece 19 is mounted in the inner panel 2 by inserting the bolt 25 as a fixing means into the insertion hole 20 formed in the mounting piece 19, and fastening the bolt 25 with a nut 2a firmly fixed in the inner panel 2. Thus, the upper edge 31a of the airbag 30 (airbag body 31) is mounted in the body 1 on the upper edge side of the windows W1 and W2 (see FIGS. 2 and 3).

Figure 4:
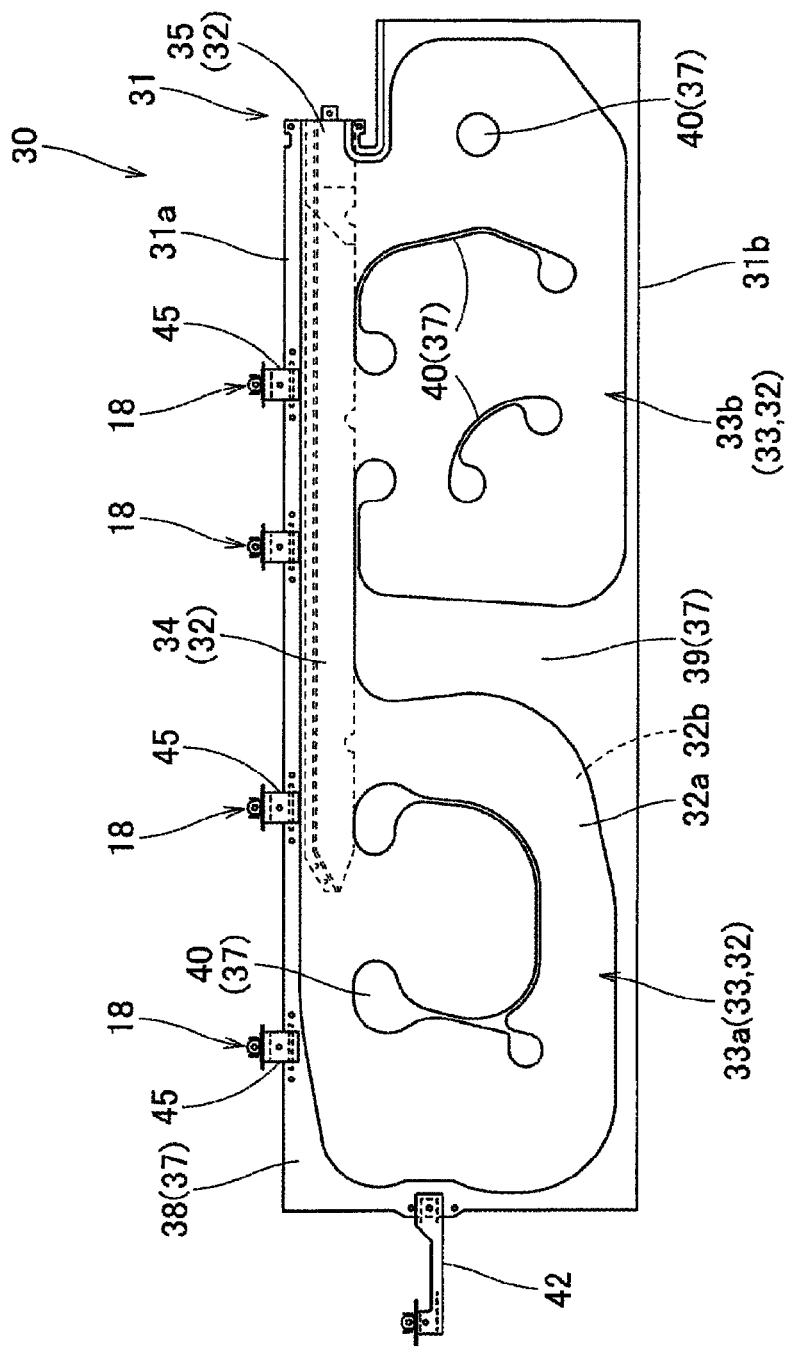
FIG. 4 is a front view illustrating a state where an airbag used in the head-protecting airbag device of the embodiment is flatly deployed.
Figure 6:
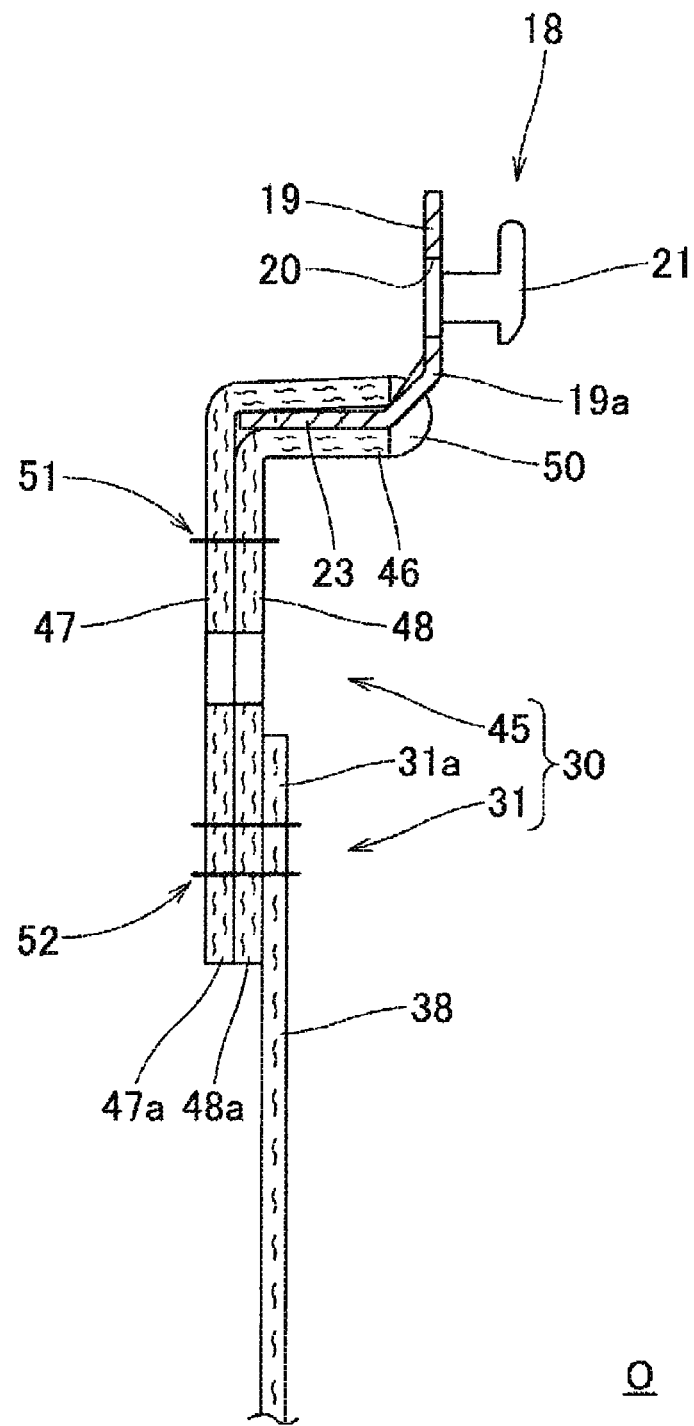
FIG. 6 is a partially enlarged sectional view illustrating the connecting tab connected with the mounting bracket in the airbag of FIG. 4.

As illustrated in FIGS. 4 to 6, the airbag 30 includes the airbag body 31 and the connecting tab 45 which protrudes upward from the upper edge 31a of the airbag body 31 to be connected with the mounting bracket 18.

As illustrated by the two-dot chain line of FIG. 1, the airbag body 31 is deployed from a folded state by allowing the inflation gas to flow from the inflator 12 thereto. The airbag body 31 is deployed to cover the indoor side of the windows W1 and W2, a center pillar CP, and an intermediate pillar garnish 7 and a rear pillar garnish 8 of the rear pillar RP. As illustrated in FIG. 4, the airbag body 31 includes a gas admissive portion 32 which allows inflation gas G to flow so as to inflate the airbag body in such a manner as to separate an indoor side wall 32a and an outdoor side wall 32b, and a non-inflow portion 37 which is formed such that the indoor side wall 32a and the outdoor side wall 32b are coupled with each other so that the inflation gas is not allowed to flow. In the case of the embodiment, the gas inflow portion 32 includes a protection inflatable portion 33, a gas guidance path 34 which allows the inflation gas to flow to the protection inflatable portion 33, and a connection opening 35. The non-inflow portion 37 includes a circumferential edge 38, a plate-shaped portion 39, and a closing portion 40.

As illustrated in FIG. 4, the protection inflatable portion 33 of the gas inflow portion 32 includes a front protection portion 33a which covers the window W1 on the side of the front seat when the airbag 30 is completely inflated, a rear protection portion 33b which covers the window W2 on the side of the rear seat. In the upper edge 31a of the airbag body 31, the gas guidance path 34 is disposed to extend substantially in the front and rear direction. The gas guidance path 34 is configured such that the inflation gas G discharged from the inflator 12 is guided to the protection inflatable portion 33 (front protection portion 33a and rear protection portion 33b) disposed below the gas guidance path 34. In the case of the embodiment, in the rear end of the gas guidance path 34, the connection opening 35 is formed to project rearward from the airbag body 31. The rear end of the connection opening 35 is configured to be open such that the inflator 12 is connectable thereto. When the airbag 30 is completely inflated, the front protection portion 33a and the rear protection portion 33b become narrower in width dimension in the front and rear direction than in the state of being flatly deployed. The closing portion 40 is disposed in the inner area such that the thickness is regulated to maintain a plate shape extending in the front and rear direction.

The circumferential edge 38 of the non-inflow portion 37 is formed to surround the outer circumferential edge of the gas inflow portion 32 over the entire area excluding the rear end of the connection opening 35. The plate-shaped portion 39 is disposed between the front protection portion 33a and the rear protection portion 33b, and is a substantially rectangular-shaped plate.

In the case of the embodiment, the airbag body 31 is formed of a double weave made of polyimide, polyester, or the like. The connecting tab 45 is configured separately from the airbag body 31. The airbag body 31 includes a connection belt 42 which extends forward from the front end to mount the front end to the body 1. In the case of the embodiment, the connection belt 42 is also configured separately from the airbag body 31. In the case of the embodiment, in the front end of the airbag body 31, the connection belt 42 is disposed to extend forward from the slightly upper position than a vertical center in the state of being flatly deployed. The front end is fixedly mounted in the inner panel 2 in the front pillar FP by using a predetermined mounting member.

Figure 10:
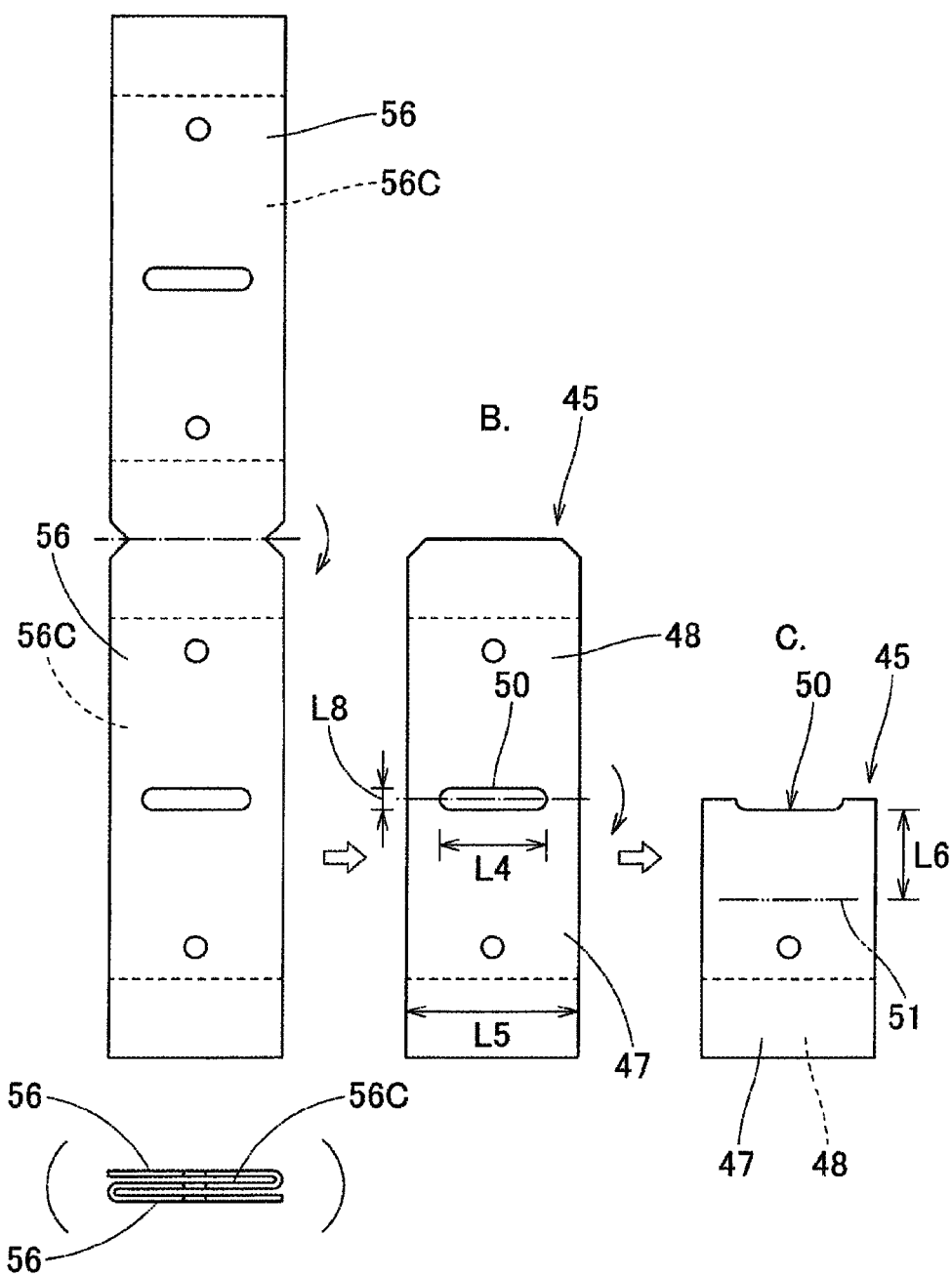
FIG. 10 is a schematic view illustrating a process of forming the connecting tab by using the connecting tab material of FIG. 9.

The connecting tab 45 is a member for mounting the upper edge 31a of the airbag body 31 in the inner panel 2 of the body 1 of the vehicle V. As illustrated in FIGS. 4 to 6, the connecting tabs 45 are disposed in a plurality of positions in the front and rear direction to project from the upper edge 31a of the airbag body 31. In the case of the embodiment, the connecting tabs 45 are disposed in four positions. Each connecting tab 45 is formed as a loop shape with the flexibility. In the case of the embodiment, the connecting tab 45 is formed by folding a base material formed of a woven fabric such as polyamide or polyester plural times (to be described in detail later). In FIG. 6, the state of the overlapped base material is not illustrated. The connecting tab 45 has a loop shape, which is open in the front and rear direction, by coupling both ends, in a longitudinal direction, of a sheet body having substantially band-shaped outer shape to the airbag body 31. The connecting tab 45 includes the folded portion 46 which is the tip (upper end) separated from the airbag body 31, and a front side portion 47 and a back side portion 48 which extend from the folded portion 46 toward the airbag body 31 and cover the front side and the back side of the connecting piece 23 in the mounting bracket 18. As illustrated in FIGS. 5 and 6, in the embodiment, a portion which covers the upper side surface (indoor side surface) of the connecting piece 23 is set to the front side portion 47, and a portion which covers the lower side surface (outdoor side surface) of the connecting piece 23 is set to the back side portion 48. The insertion hole 50 for inserting the mounting piece 19 of the mounting bracket 18 is disposed in the center of the folded portion 46 of the connecting tab 45 in the front and rear direction. In the case of the embodiment, the insertion hole 50 is configured to be an opening having a substantially ellipse shape in the front and rear direction (see Section B of FIG. 10). A length dimension (width dimension in a longitudinal direction) L4, and a width dimension L8 in a transverse direction are set in such an extent to insert the entire mounting piece 19 including the locking claw 21, respectively. In the connecting tab 45, a width dimension L5 (see Section B of FIG. 10) is set to be larger than the width dimension L2, in the front and rear direction, of the mounting piece 19 of the mounting bracket 18. In the case of the embodiment, the width dimension L5 is set to be smaller than the width dimension L1 of the connecting piece 23 in the front and rear direction. In the case of the embodiment, the width dimension L5 of the connecting tab 45 is set to about five-thirds of the width dimension L2 of the mounting piece 19 in the front and rear direction, and to about seven-tenth of the width dimension L1 of the connecting piece 23 in the front and rear direction. As illustrated in FIGS. 7 and 12B, in the case of the embodiment, the connecting tab 45 is configured such that the connecting tab covers about a half of the opening 23a formed in the connecting piece 23, and the other half of the opening 23a is exposed.

In the case of the embodiment, in the connecting tab 45, the front side portion 47 and the back side portion 48 are coupled to the airbag body 31 in the base portion (lower ends 47a and 48a). Separately from an airbag body coupling portion 52 coupled to the airbag body 31, the front side portion 47 and the back side portion 48 are coupled to each other in a portion of a loop coupling portion 51 so as to have a loop shape on the tip side from the loop coupling portion 51. In the state of storing the connecting piece 23 in the connecting tab 45, the loop coupling portion 51 is configured to be disposed in such a position that can prevent the mounting piece 19 from coming off the insertion hole 50. In the case of the embodiment, the loop coupling portion 51 is disposed in a position, which is separated from the upper edge 31a of the airbag body 31, of the front side portion 47 and the back side portion 48. In detail, in a state where the connecting tab 45 is flatly deployed without the mounting bracket stored therein, the loop coupling portion 51 is formed in a position above the almost vertical center of the connecting tab 45 (see Section C of FIG. 10). Specifically, in the flatly deployed connecting tab 45, it is necessary that a length dimension L6 (see Section C of FIG. 10) from the loop coupling portion 51 to the insertion hole 50 is set to be smaller than the sum of a width dimension H1 of the mounting piece 19 in the vertical direction and the width dimension L3 of the connecting piece 23 in the indoor and outdoor direction in the mounting bracket 18. In the embodiment, the length dimension L6 is set to such a dimension that is larger about 2 to 5 mm than the width dimension L3 of the connecting piece 23 in the indoor and outdoor direction. As illustrated in FIG. 5, in the case of the embodiment, the loop coupling portion 51 is formed in a linear shape in a projecting direction (front and rear direction) of the connecting piece 23 over the almost entire portion of the connecting tab 45 in the front and rear direction. In a state where the connecting piece 23 is stored in the connecting tab 45 such that the mounting piece 19 projects from the insertion hole 50, the loop coupling portion 51 is formed by sewing the front side portion 47 and the back side portion 48 by a stitching thread.

Figure 9:
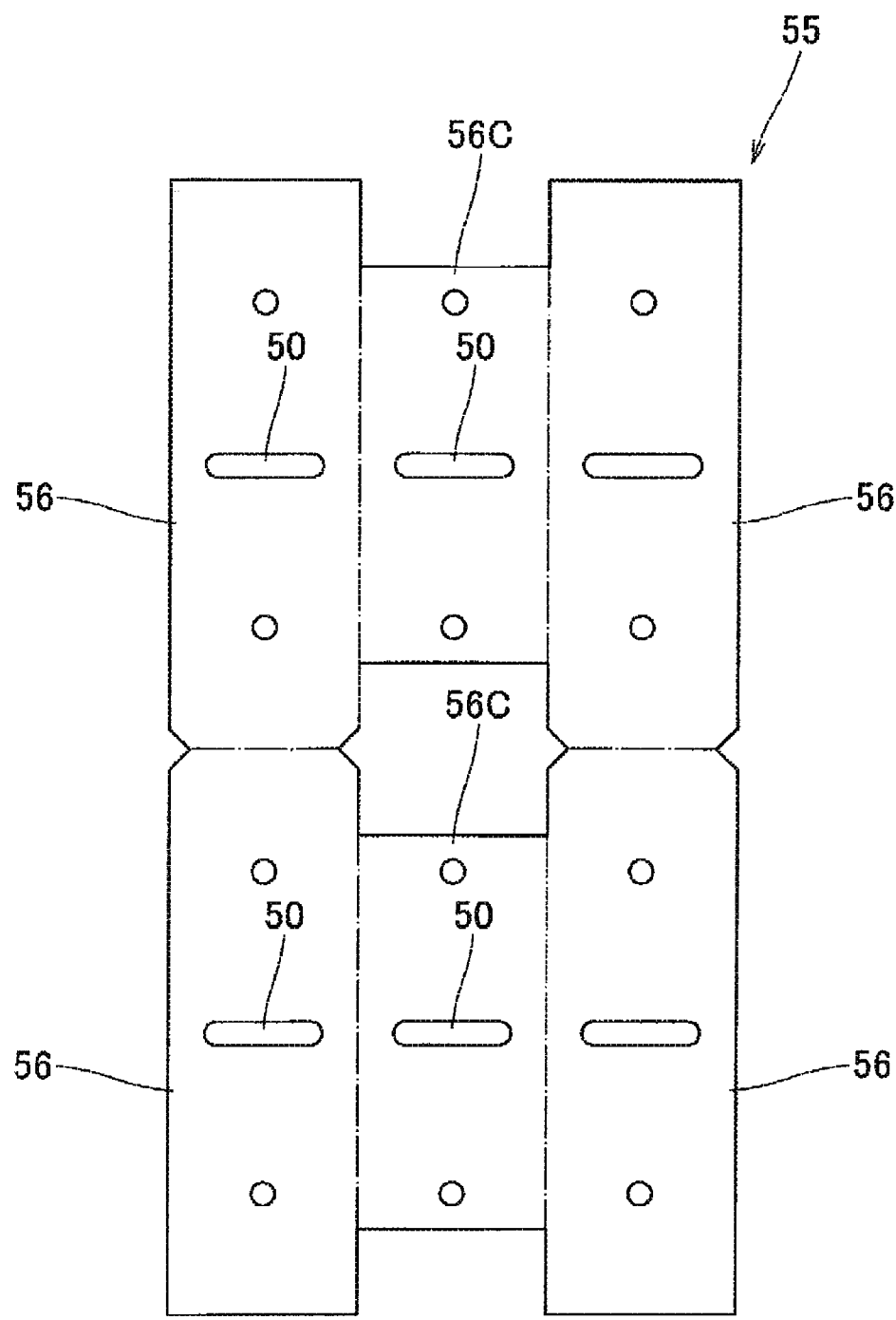
FIG. 9 is a plan view of a state where a connecting tab material forming the connecting tab in the airbag of FIG. 4 is flatly deployed.

In the case of the embodiment, the connecting tab 45 is formed by folding a connecting tab material 55 illustrated in FIG. 9. Two connecting tab component pieces 56 are provided in parallel to each other in a longitudinal direction, three connecting tab component pieces 56 are provided in parallel to each other in the transverse direction, and the connecting tab material 55 has total six pieces provided in parallel to each other. Two pieces disposed in the center in the transverse direction are configured to have short width dimension in the longitudinal direction. A connecting tab component piece 56C disposed in the center is configured to be shorter than the remaining connecting tab component piece 56 by cutting a portion coupled to the airbag body 31 (the lower ends of the front side portion 47 and the back side portion 48). The cutting is performed in order to suppress that a region of the airbag body coupling portion 52 is thicker than necessary. As illustrated in Section A of FIG. 10, in the embodiment, first, the connecting tab material 55 is folded in three to be overlapped in the transverse direction with the connecting tab component piece 56C on the central side interposed therebetween. As illustrated in Section B of FIG. 10, when the material folded in three is folded in two to be overlapped in a longitudinal direction, the connecting tab 45 having a shape of being folded in six (a shape of being folded in six in each of the front side portion 47 and the back side portion 48) can be formed.

As illustrated in FIG. 2, the case 60 which stores the folded airbag 30 (completely folded body 66) is formed to have substantial a reversed U shape in sectional view to store the completely folded body 66, and to have a long shape extending in the front and rear direction. As illustrated in FIG. 1, in the case of the embodiment, two of the case 60F which stores the front protection portion 33a and the case 60R which stores the rear protection portion 33b are used as the case 60.

Figure 11:
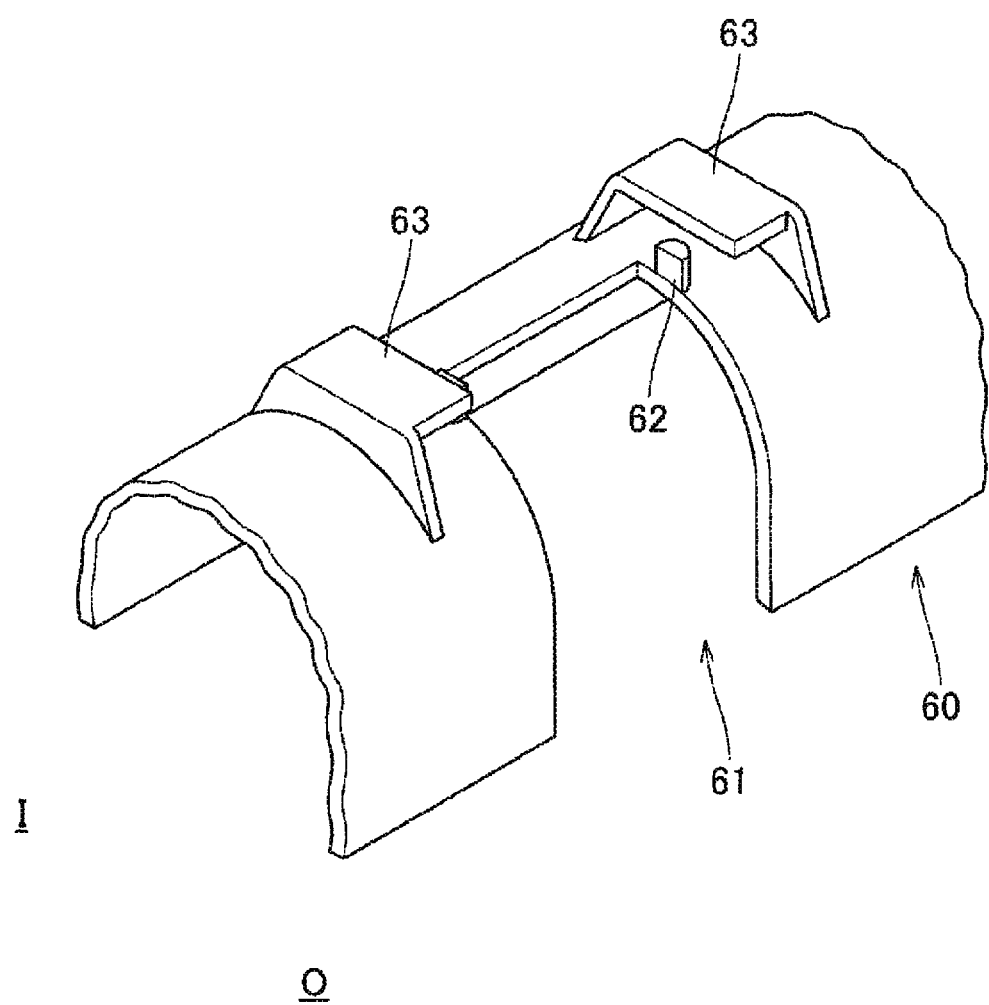
FIG. 11 is a partially enlarged perspective view schematically illustrating a case used in the head-protecting airbag device of the embodiment.
Figure 13:
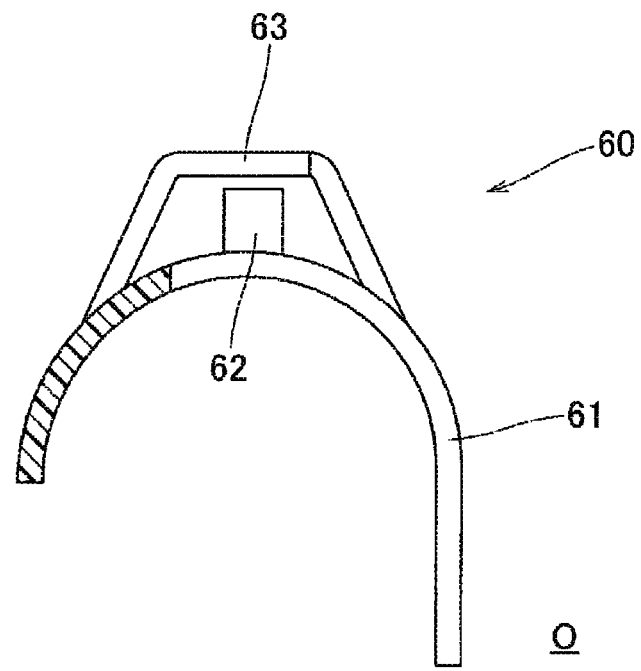
FIG. 13 is a sectional view of a portion taken along line XIII-XIII of FIGS. 12A and 12B.

The case 60 (60F and 60R) is formed of synthetic resin such as polyolefin-based thermoplastic elastomer, and is configured to cover from the outdoor side O of the completely folded body 66 toward the upper surface. As illustrated in FIGS. 11 to 13, in each of the cases 60 (60F and 60R), a cutout recess 61 is formed in a portion, in which the connecting tab 45 is disposed, by partially cutting a portion on the outdoor side in order to insert the connecting tab 45 projecting from the completely folded body 66. The cutout recess 61 is formed from the lower end of the case 60 on the outdoor side toward the upper surface. A width dimension L7 (see FIGS. 12A and 12B) of the opening in the front and rear direction is configured such that the connecting tab 45 can be inserted thereinto, and the width dimension L7 is configured to be smaller than the width dimension L1 of the connecting piece 23 of the mounting bracket 18 in the front and rear direction. In a state where the completely folded body 66 is stored in the case 60, the protrusion 62, which is inserted into the openings 23a and 23a formed in the connecting piece 23, is formed to project upward from the upper surface of both front and rear edges of the cutout recess 61. (see FIGS. 11 to 14). In a state where the completely folded body 66 is stored in the case 60, a pressing piece 63, which can press the upper surface of the front end portion 23b and the rear end portion 23c as both front and rear end portions of the connecting piece 23, is disposed in the end edges of the protrusion 62 in the front and rear direction. The pressing piece 63 is disposed such that a gap into which the connecting piece 23 can be inserted is provided between the pressing piece 63 and the upper surface of the case 60. In the case of the embodiment, the end edge in the front and rear direction and the end edge on the indoor side are formed to be connected from the case 60. The front end portion 23b and the rear end portion 23c of the connecting piece 23 are inserted from the outdoor side into the gap between the pressing piece 63 and the upper surface of the case 60. When the completely folded body 66 is stored in the case 60, the connecting tab 45 is disposed to be inserted to the cutout recess 61 such that the mounting piece 19 of the mounting bracket 18 projects upward. At that time, in a state where the protrusion 62 is inserted into the opening 23a, in the connecting piece 23 of the mounting bracket 18, the upper surfaces of the front end portion 23b and the rear end portion 23c are pressed by the pressing piece 63. In the embodiment, when the upper surfaces of the front end portion 23b and the rear end portion 23c of the connecting piece 23 are pressed by the pressing piece 63, a state where the protrusion 62 is inserted into the opening 23a can be maintained. In this manner, the mounting bracket 18 projecting from the completely folded body 66 is temporarily locked in the case 60. In the embodiment, the case 60 is configured such that a predetermined position (not illustrated) thereof is mounted on the inner panel 2 of the body 1.

Next, the description will be given about mounting the head-protecting airbag device M of the embodiment in the vehicle V. In a state where the mounting piece 19 of the mounting bracket 18 projects from the insertion hole 50, the front side portion 47 and the back side portion 48 of the connecting tab 45 are sewed by the stitching thread to form the loop coupling portion 51. First, the airbag body 31 is folded to allow the lower edge 31b approach the upper edge 31a from a state where the indoor side wall 32a and the outdoor side wall 32b are flatly deployed to be overlapped, thereby forming the long completely folded body 66 in the front and rear direction. Specifically, in the embodiment, the airbag body 31 is folded in such a manner that the gas guidance path 34 of the airbag body 31 on the upper edge 31a side is bellows-folded by attaching a plurality of creases in the front and rear direction, and the protection inflatable portion 33 under the gas guidance path 34 is rolled such that the lower edge 31b is wound toward the outdoor side (see FIG. 2). The predetermined position around the completely folded body 66 is wrapped with a breakable wrapping material for collapse prevention (not illustrated) after forming the completely folded body 66.

Next, the connecting tab 45 in the state of being connected with the mounting bracket 18 is sewed to the upper edge 31a, which is exposed on the upper surface side of the completely folded body 66, of the airbag body 31 with the stitching thread so as to form the airbag body coupling portion 52. After that, the completely folded body 66 is stored in the case 60 (60F and 60R), and the inflator 12 to which the mounting bracket 14 has been attached is connected to the connection opening 35 of the airbag 30 with a clamp 13, whereby an airbag assembly can be formed. In the embodiment, the connecting tab 45 connected with the mounting bracket 18 is sewed after the airbag body 31 is completely folded. However, the connecting tab 45 connected with the mounting bracket 18 may be sewed to the airbag body 31 before folding the airbag body 31, and then the airbag body 31 may be folded.

Next, the mounting brackets 14 and 18 are disposed in a predetermined position of the inner panel 2 of the body 1, and locked with the bolts 15 and 25. A lead wire (not illustrated) extending from a predetermined control device for operating an inflator is connected to the inflator 12. The front pillar garnish 4 and the roof head lining 5 are mounted in the inner panel 2 of the body 1, and pillar garnishes 6 and 7 are mounted in the inner panel 2 of the body 1, whereby the head-protecting airbag device M can be mounted in the vehicle V.

When the inflator 12 is operated by receiving an operation signal from the control device after the head-protecting airbag device M is mounted in the vehicle V, the inflation gas discharged from the inflator 12 flows into the airbag body 31. The inflating airbag body 31 presses and opens the airbag cover 9 while breaking the wrapping material (not illustrated), and is deployed to project downward. As illustrated by the two-dot chain line of FIG. 1, the inflation is completed to cover the windows W1 and W2 and the indoor sides of the center pillar CP and the rear pillar RP.

In the head-protecting airbag device M of the embodiment, when the airbag body 31 is deployed, the connecting tab 45 is supported by the connecting piece 23, which projects from the lower end of the mounting piece 19 to the both front and rear sides, in the circumferential edge of the insertion hole 50 into which the mounting piece 19 of the mounting bracket 18 is inserted. Thus, although the connecting tab 45 is strongly pulled downward when the airbag body 31 is deployed, through the mounting piece 19 interposed between both sides, a tensile force is dispersedly received by the connecting piece 23 projecting from the mounting piece 19 to the both front and rear sides. Therefore, the tensile force is hard to focus on one point, whereby it can be suppressed that the tensile force is received to deform the mounting bracket. The connecting tab 45 is configured such that the loop coupling portion 51 of the front side portion 47 and the back side portion 48 which are formed in a loop shape is disposed in such a position that can prevent the mounting piece 19 from coming off the insertion hole 50. Thus, it is possible that the mounting bracket 18 assembled with the connecting tab 45 does not come off the connecting tab 45, and the mounting bracket 18 is smoothly fixed to the body 1 or is assembled to the case 60. Although the connecting tab 45 is floated up by the reaction generated after the connecting tab 45 is strongly pulled downward at the time of inflating the airbag body 31, it can be accurately prevented that the connecting tab 45 comes off the mounting bracket 18 to release the connected state. For this reason, in the head-protecting airbag device M of the embodiment, the deformation of the mounting bracket 18 and the breakage of the connecting tab 45 can be suppressed, and thus the airbag body 31 can be inflated to smoothly cover the indoor sides of the windows W1 and W2.

Therefore, in the head-protecting airbag device M of the embodiment, with a simple configuration, the connecting tab 45 can be tightly connected to the mounting bracket 18.

The head-protecting airbag device M of the embodiment is configured such that the insertion hole 50 is formed in the connecting tab 45, the mounting piece 19 is inserted into the insertion hole 50, and thus the connecting tab 45 is connected with the mounting bracket 18. Unlike the conventional head-protecting airbag device, the connecting tab is not configured to be inserted into an insertion hole formed in the mounting bracket. For this reason, although the connecting tab 45 is configured with the materials overlapped plural times as in the embodiment, the connecting tab 45 can be connected with the mounting bracket 18 without hindrance. The configuration of overlapping the materials plural times can improve strength, and it can be accurately prevented that the connecting tab 45 is broken when the airbag body 31 is inflated.

Figure 15:
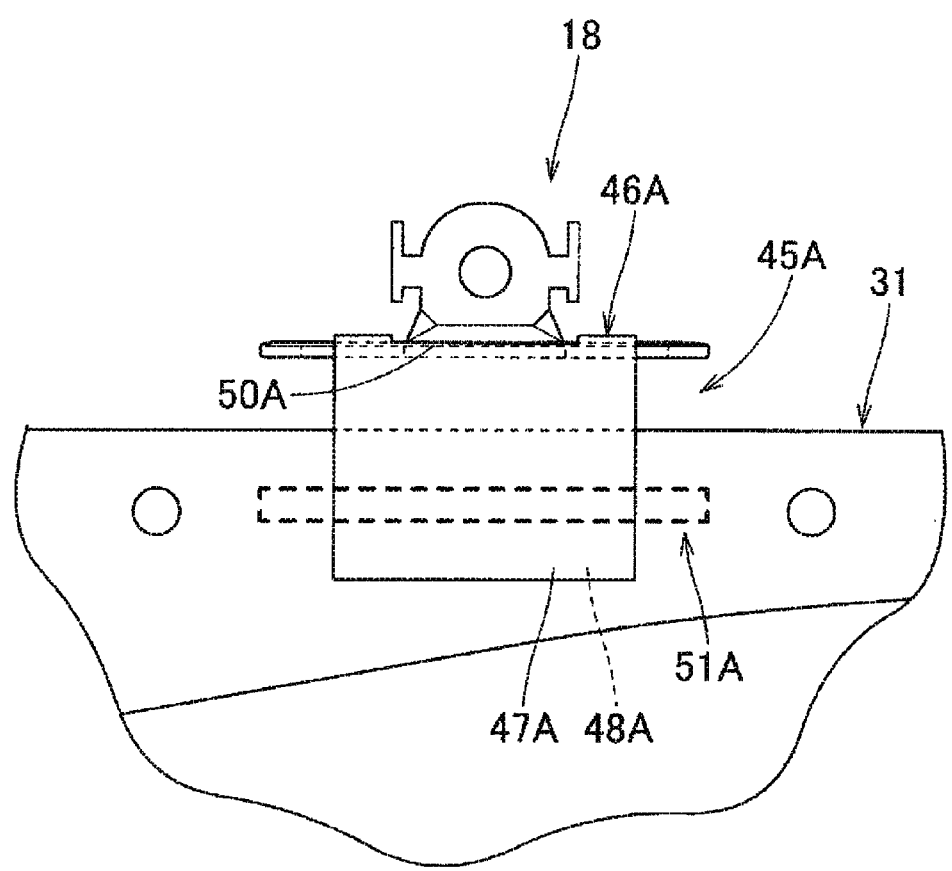
FIG. 15 is a partially enlarged front view of a connecting tab of another embodiment of the present invention.

In the head-protecting airbag device M of the embodiment, the loop coupling portion 51 of the connecting tab 45 is disposed in a position, which is separated from the upper edge 31a of the airbag body 31, of the front side portion 47 and the back side portion 48. In other words, in the head-protecting airbag device M of the embodiment, the connecting tab 45 is configured to be provided with the loop coupling portion 51 coupling the front side portion 47 and the back side portion 48 separately from the airbag body coupling portion 52 connecting the lower ends 47a and 48a of the front side portion 47 and the back side portion 48 to the upper edge 31a of the airbag body 31. Thus, by forming the loop coupling portion 51, the mounting bracket 18 can be connected to the connecting tab 45 in advance, and by using the connecting tab 45, handling operability when the mounting bracket 18 is connected to the airbag body 31 is excellent. When such a loop coupling portion 51 is disposed in a position, which is separated from the upper edge 31a of the airbag body 31, of the front side portion 47 and the back side portion 48, it is easy to set the length dimension of a loop-shaped area of the connecting tab 45 from the loop coupling portion 51 to the tip, and it can be reliably prevented that the mounting bracket 18 comes off the connecting tab 45. As illustrated in FIG. 15, in a case where the projecting amount of the connecting tab itself from the airbag body is set to be small without considering such points, the connecting tab 45A may be configured such that a loop coupling portion 51A is also used as an airbag body coupling portion and is disposed in a position, which is in the airbag body 31, of a front side portion 47A and a back side portion 48A. The projecting amount of the connecting tab 45A illustrated in FIG. 15 from the airbag body 31 is small, in other words, the length dimension thereof is small. Thus, although the connecting tab 45A is coupled directly to the airbag body 31 in the loop coupling portion 51A, it can be prevented that the mounting piece 19 comes off an insertion hole 50A.

Figure 16:
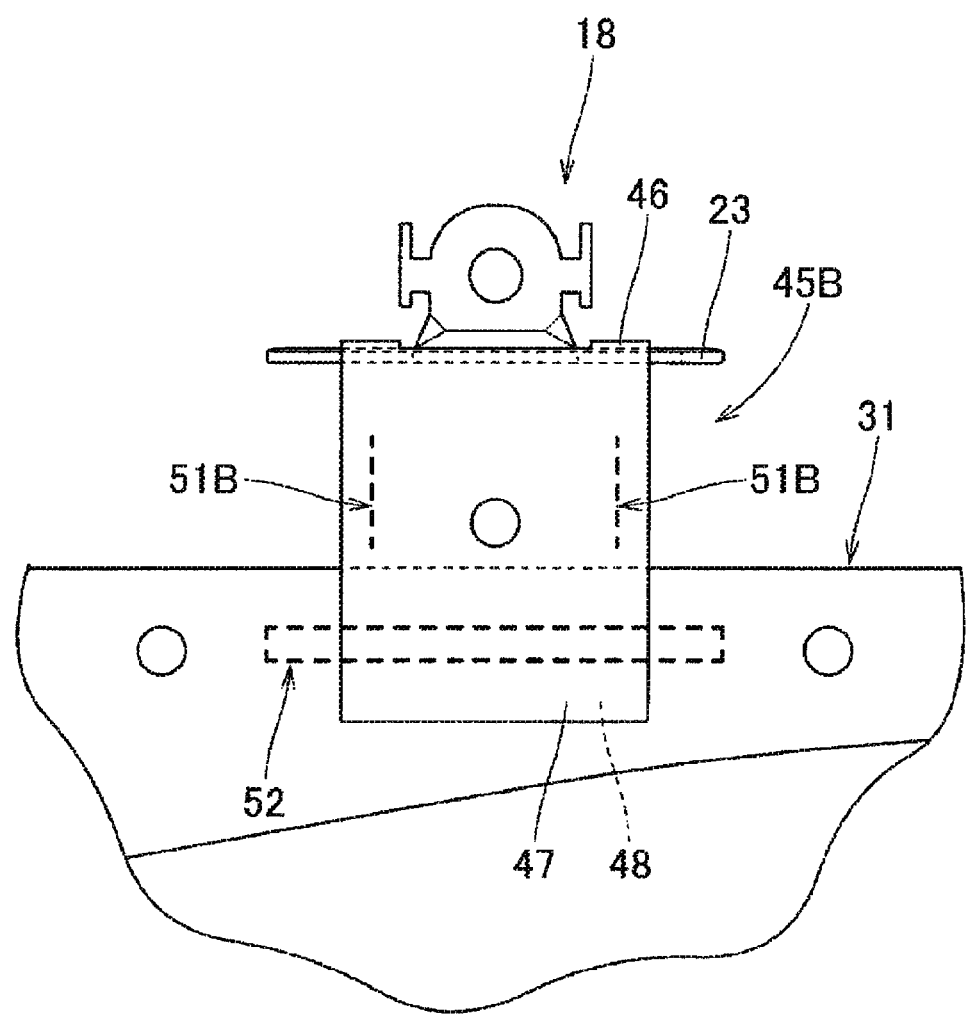
FIG. 16 is a partially enlarged front view of a connecting tab of still another embodiment of the present invention.

In the head-protecting airbag device M of the embodiment, the loop coupling portion 51 is formed of a linear sewing portion along the projecting direction (front and rear direction) of the connecting piece 23 from the mounting piece 19 of the mounting bracket 18. The shape of the loop coupling portion is not limited to the embodiment. Like the connecting tab 45B illustrated in FIG. 16, loop coupling portions 51B and 51B may be formed such that the almost vertically linear sewing portions are provided in parallel to each other in the front and rear direction to be orthogonal to the projecting direction of the connecting piece 23.

Figure 17:
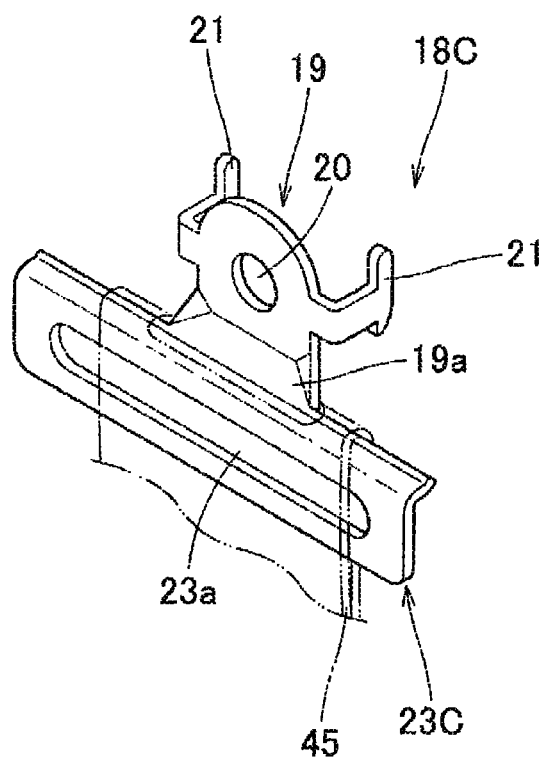
FIG. 17 is a perspective view of a mounting bracket of another embodiment of the present invention.
Figure 18:
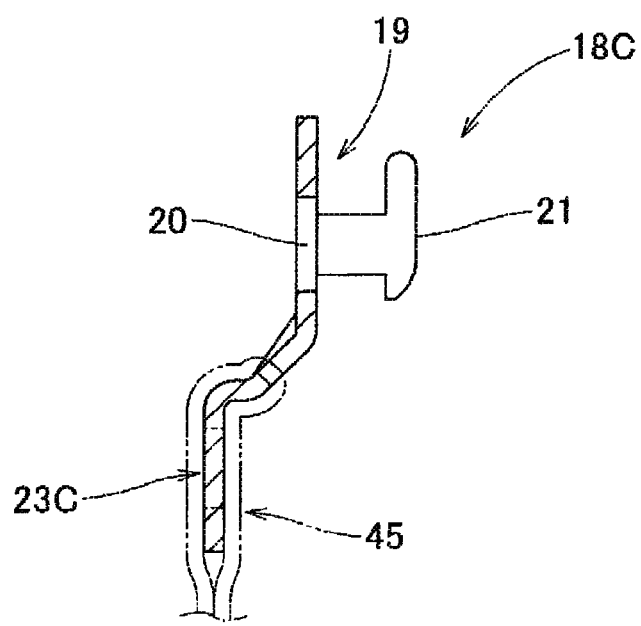
FIG. 18 is a vertical sectional view of the mounting bracket of FIG. 17.

In the head-protecting airbag device M of the embodiment, the connecting piece 23 of the mounting bracket 18 is disposed to be almost orthogonal to the mounting piece 19 and to project to the indoor side. However, the outer shape of the mounting bracket is not limited to the embodiment. For example, like a mounting bracket 18C illustrated in FIGS. 17 and 18, the connecting piece 23C, which is formed to be wider than the mounting piece 19 to project from the lower end 19a of the mounting piece 19 to the both front and rear sides, may be disposed to be offset from the mounting piece 19 to the indoor side to extend downward. The mounting bracket 18 used in the head-protecting airbag device M of the embodiment is configured such that the connecting piece 23 is disposed on the upper side of the completely folded body 66 when mounted on the vehicle, and thus it is easy to be mounted in the vehicle of a type which easily secures vertically wide storage space. The mounting bracket 18C illustrated in FIGS. 17 and 18 is configured such that the connecting piece 23C is disposed on the outdoor side of the completely folded body when mounted on the vehicle, and thus it is easy to be mounted in the vehicle of a type which easily secures a storage space wide in the indoor and outdoor direction.

What is claimed is:

1. A head-protecting airbag device comprising:
   an airbag which is stored in an upper edge on an indoor side of a vehicle and is inflated to cover an indoor side of a window when inflation gas is allowed to flow inside; and
   a mounting bracket which mounts an upper edge of the airbag on a body on an upper edge side of the window, wherein;
   the airbag includes: an airbag body; and a connecting tab having a loop-shape, protruding upward from an upper edge of the airbag body, being connected with the mounting bracket and having flexibility;
   the mounting bracket includes: a mounting piece being mounted on the body with a fixing means; and a connecting piece being formed to be wider than the mounting piece to project to both sides from a lower end of the mounting piece, and being connected with the airbag;
   in the connecting tab, an insertion hole, into which the mounting piece of the mounting bracket is inserted, is disposed in a folded portion of a tip separated from the airbag body;
   the connecting tab includes a front side portion and a back side portion which extend from the folded portion to the airbag body and cover a font side and a back side of the connecting piece; and
   a loop coupling portion of the front side portion and the back side portion which form the connecting tab in a loop shape is disposed in a position where the mounting piece of the mounting bracket having the connecting piece stored in the connecting tab is prevented from coming off the insertion hole.

2. The head-protecting airbag device according to claim 1, wherein
   the loop coupling portion of the connecting tab is disposed in a position, which is separated from the upper edge of the airbag body, of the front side portion and the back side portion.

3. The head-protecting airbag device according to claim 1, wherein
   the loop coupling portion of the connecting tab is disposed in a position, which is in the airbag body, of the front side portion and the rear side portion as a position where the front side portion and the back side portion are couplable with the airbag body.

4. The head-protecting airbag device according to claim 2, wherein
   the loop coupling portion of the connecting tab is formed of a linear sewing portion along a projecting direction of the connecting piece from the mounting piece of the mounting bracket.

5. The head-protecting airbag device according to claim 3, wherein the loop coupling portion of the connecting tab is formed of a linear sewing portion along a projecting direction of the connecting piece from the mounting piece of the mounting bracket.

6. The head-protecting airbag device according to claim 2, wherein
the loop coupling portion of the connecting tab is formed such that linear sewing portions are provided in parallel to each other to be orthogonal to a projecting direction of the connecting piece from the mounting piece of the mounting bracket.

7. The head-protecting airbag device according to claim 3, wherein
the loop coupling portion of the connecting tab is formed such that linear sewing portions are provided in parallel to each other to be orthogonal to a projecting direction of the connecting piece from the mounting piece of the mounting bracket.

\* \* \* \* \*